UNITED STATES PATENT OFFICE.

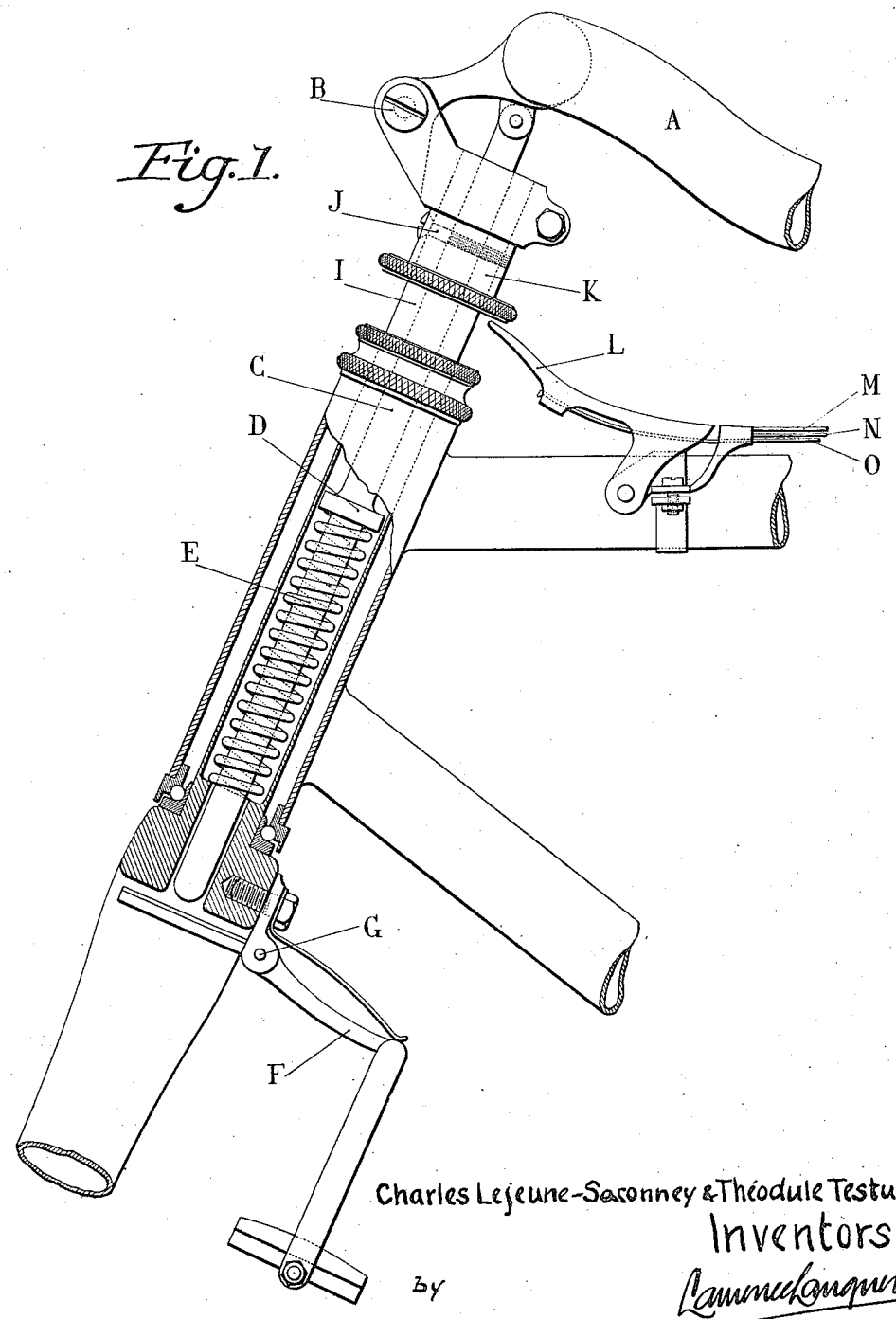

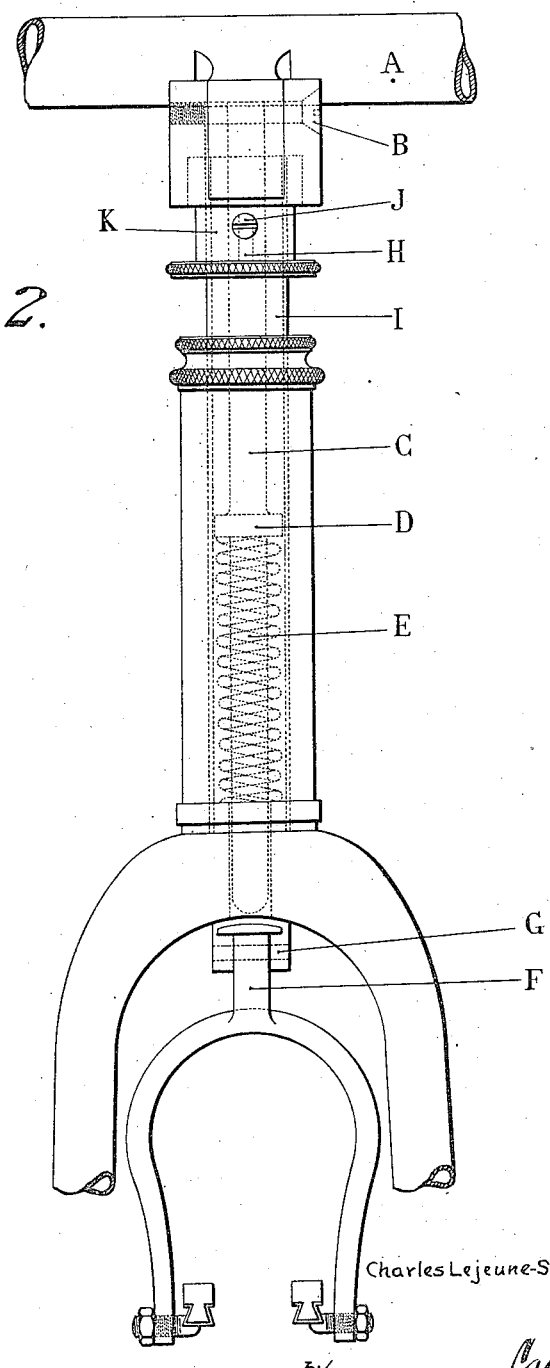

CHARLES LEJEUNE-SACONNEY AND THÉODULE TESTU, OF NICE, FRANCE.

HANDLE-BAR WITH UNIVERSAL CONTROL FOR BICYCLES AND MOTOR-CYCLES.

1,269,101.              Specification of Letters Patent.     Patented June 11, 1918.

Application filed January 31, 1917. Serial No. 145,773.

*To all whom it may concern:*

Be it known that we, CHARLES LEJEUNE-SACONNEY, resident of 26 Avenue Mirabeau, Nice, France, and THÉODULE TESTU, resident of Villa Mignon, Avenue Buenos Aires, Nice, France, both citizens of the French Republic, have invented certain new and useful Improvements in Handle-Bars with Universal Control for Bicycles and Motor-Cycles, of which the following is a specification.

This invention relates to handle bars for cycles and motor cycles; it has for its object to mount the handle bar upon the steering column of the cycle in such a manner that when a downward pressure is exerted on the ends thereof the brakes on the front and back wheels are simultaneously and progressively applied, while in the case of motor cycles the ignition may also be cut off and the admission valve raised at the same time.

In the accompanying drawing:

Figure 1 shows a side elevation of the steering column partly in section, with the handle bar applied thereto, and Fig. 2 is a front elevation.

The handle bar A pivoted at B to the steering column or tube I of the front fork, is normally held raised by means of a coiled spring E, the brakes in this position of the handle bar being in their inoperative position. When downward pressure is exerted on the handle bar it turns on its pivot B and depresses the rod C pivotally connected to said handle bar; the rod C in turn compresses a spring E by means of a shoulder D thereon. After the rod C has been depressed a short distance its lower end presses upon a lever F pivoted at G, and adapted to operate the front wheel brake by bringing the brake blocks into contact with the rim of the wheel. When the rod C is depressed a screw J passing through a collar K and through a slot H in the tube I of the front fork, moves downward with the said collar. This collar in turn acts upon the end of a lever L which is of a known type serving to operate through flexible connections M, N and O, in a known manner, the back wheel brake and the mechanism for cutting off the ignition and raising the admission valve.

When the pressure on the handle bar is relieved, the bar is returned to its normal position by the action of the spring E on the shoulder D of the rod C.

Having thus described our invention what we claim as new and desire to secure by Letters Patent is:—

Controlling mechanism for cycles and motorcycles comprising in combination with the front fork and steering tube, a handle bar pivoted to the tube, a rod pivoted to the handle bar and passing downwardly through said tube, brake mechanism controlled by the lower end of said rod, a spring acting upon the rod to hold the handle bar normally in the raised position, a collar sliding on the tube, a projection on the rod coöperating with the collar and mechanism including a lever for operating the rear brake of the cycle adapted to be controlled by said collar, said lever projecting into the path of, but separated from, said collar.

CHARLES LEJEUNE-SACONNEY.
THÉODULE TESTU.

Copies of this patent may be obtained for five cents each, by addressing the "Commissioner of Patents, Washington, D. C."